United States Patent [19]

Preussner et al.

[11] Patent Number: 4,787,725
[45] Date of Patent: Nov. 29, 1988

[54] PANORAMIC PERISCOPE

[75] Inventors: Theodor Preussner, Ermlaadstrasse 92 E, D-3004 Tseruhagen (NB); Jochen S. Fischinger, Baddeynhansen, both of Fed. Rep. of Germany

[73] Assignee: Theodor Preussner, Isernhagen, Fed. Rep. of Germany

[21] Appl. No.: 1,683

[22] Filed: Jan. 9, 1987

[30] Foreign Application Priority Data

Jan. 14, 1986 [DE] Fed. Rep. of Germany ....... 3600752

[51] Int. Cl.$^4$ .............................................. G02B 23/08
[52] U.S. Cl. .................... 350/539; 350/541; 350/543
[58] Field of Search ............... 350/506, 539–544, 350/557–558; 356/147

[56] References Cited

U.S. PATENT DOCUMENTS

| 784,852 | 3/1905 | Goerz | 350/539 |
| 869,395 | 10/1907 | Schleth | 350/543 |
| 2,147,615 | 2/1939 | Baroni | 350/539 |
| 2,152,726 | 4/1939 | Baroni | 350/540 |

FOREIGN PATENT DOCUMENTS

| 342843 | 10/1921 | Fed. Rep. of Germany . | |
| 657304 | 11/1967 | Fed. Rep. of Germany . | |
| 502561 | 3/1939 | United Kingdom | 350/539 |

OTHER PUBLICATIONS

Jacobs, D. H., "Fundementals of Optical Engineering", McGraw-Hill, 1943, pp. 152–161 and 221–223.
German Patent Search Dated 9/7/86, P 36 00 752.8

Primary Examiner—John K. Corbin
Assistant Examiner—Martin Lerner

[57] ABSTRACT

A panoramic periscope having a ray path for the visual observation of objects and having a central tube with an ocular or eyepiece disposed laterally thereon, the central tube being provided with a system of lenses, prisms and mirrors and having a peripheral viewing window which is mounted so as to be rotatable about the longitudinal axis of the central tube through 360° or more, the window being mounted in a viewing hood disposed above the central tube and lying at an angle relative to the longitudinal axis of the central tube, the window being radially disposed in a viewing housing which has a reversing prism or the like and is mounted so as to be additionally rotatable about its own longitudinal axis at an angle relative to the longitudinal axis of the central tube, characterized by a system of prisms and/or mirrors which is constructed in such a manner that, when the viewing window is rotated from a position on one side of the zenith to a position on the other side of the zenith, a real, true-to-side, upright image appears in the eye lens or ocular.

9 Claims, 4 Drawing Sheets

PANORAMIC PERISCOPE

The present invention relates to a panoramic periscope (telescope) having a ray path for the visual observation of objects and having a central tube with an eyepiece disposed laterally thereon, systems of lenses, prisms and mirrors disposed therein, and a viewing window which is mounted so as to be rotatable about the longitudinal axis of the central tube through 360° or more, said window being mounted in a viewing hood disposed above the central tube and being at right angles to the longitudinal axis of the central tube.

Such a panoramic periscope is already known from German Patent Specification No. 342 843, wherein a viewing hood is rotatably mounted at the upper end of a central tube having a lateral eyepiece, a lateral viewing window having a system of lenses and prisms for viewing objects in the horizontal plane and being provided on the periphery of the viewing hood.

Consequently, the viewing window is also displaced by the rotation of the viewing hood, and the ray path of the viewing window extends perpendicular to the longitudinal axis of the viewing hood. Such panoramic periscopes are generally situated perpendicularly for a wide range of purposes and, by changing the horizontal (lateral) visual angle, it is possible to see in the panoramic view one or more objects lying substantially in the horizontal plane.

Due to a certain amount of known angular adjustment (acute angle) of the viewing window or of the associated system of prisms or mirrors, it is additionally also possible to observe objects vertically (at acute angles of elevation).

However, such instruments are not suitable, for example, for moving objects which are situated or move in the zenith or rearwardly therebeyond.

Insofar as a panoramic periscope (or telescope) is disclosed in U.S. Pat. No. 2,147,615 and in German Gebrauchsmuster (Utility Model) No. 1 982 098, such also comprises a viewing housing which is mounted so as to be additionally rotatable about its own longitudinal axis at an angle to the longitudinal axis of the central tube. In this case, viewing an object behind the periscope, i.e. beyond the zenith, is also partially possible in addition to panoramic viewing. However, such panoramic periscopes do not provide images in the eyepiece which are close to reality.

The invention seeks to provide a panoramic periscope of the above-described type, whereby, in addition to the known manner of viewing the object in the horizontal plane, it is also possible to view the object beyond the zenith with an upright, real image always appearing in the ocular.

With a panoramic periscope of the above-described type, this object is achieved, according to the invention, by a system of lenses, prisms or mirrors, in that, upon rotation of the viewing window beyond the zenith, a real, true-to-side, upright image can appear in the eye lens. Thus, the periscope of the present invention allows an observer to view an object as it moves beyond the zenith, that is, from a position on one side of the zenith to a position on the other side of the zenith. The image of such a moving object will remain upright and true-to-side with the present invention periscope. Also, an object that is beyond the zenith in the sense that it is behind the periscope can be viewed with an upright, true-to-side image.

Thus, according to the present invention there is provided a panoramic periscope having a ray path for the visual observation of objects and having a central tube with an ocular or eyepiece disposed laterally thereon, the central tube being provided with a system of lenses, prisms and mirrors and having a peripheral viewing window which is mounted so as to be rotatable about the longitudinal axis of the central tube through 360° or more, said window being mounted in a viewing hood disposed above the central tube and lying at an angle relative to the longitudinal axis of the central tube, the window being radially disposed in a viewing housing which has a reversing prism or the like and is mounted so as to be additionally rotatable about its own longitudinal axis at an angle relative to the longitudinal axis of the central tube, characterised by a system of prisms and/or mirrors which is constructed in such a manner that, when the viewing window is rotated beyond the zenith, a real, true-to-side, upright image appears in the eye lens or ocular.

Consequently, despite the viewing window and hence the ray path passing from the horizontal, via the zenith, into the opposite horizontal again, the upright and true-to-side representation of each (especially) moving object does not alter, for example, when an airplane flies over the observer.

Since such a panoramic periscope can not only be pivoted in respect of the plane (through 360° or more), but it can also be pivoted from the horizontal plane vertically upwardly and downwardly, as desired, through 360° or more, it makes the whole three-dimensional area therearound visible with total image correction. Three-dimensional angles can be accurately measured therein.

In a preferred embodiment, an additional prism or mirror system may be incorporated into the ray path between the eye lens and the viewing window and, despite the ray path of observation overhead, such a system permits an upright, true-to-side image to appear and can be pivoted out again from the ray path between the eye lens and viewing window during the return passage of the ray path in the zenith. The additional prism is necessary and is inserted only at the zenith for the entire rear field of vision in order to produce a true-to-side, upright image. Prior to passing through the zenith, during the front field of vision, the additional prism is not used.

In an additional, preferred embodiment, two diametrically opposed viewing windows are each provided with a housing and are mounted in the panoramic hood so as to be coaxially rotatable in synchronism about their common longitudinal axis. The two housings, which are provided with radial viewing windows, lie on a common longitudinal axis about which they also rotate in synchronism.

It is preferable to displace the central tube and/or a transmission shaft mounted therein for the displacement of the viewing windows by means of a single planetary wheel rotary gear or a double planetary wheel rotary gear.

In such a case, it is preferable either to use a first reversing Dove prism, wherein the sides of the image are transposed after passage of the ray such that the image is laterally reversed or inverted, which is rotatably driven at half the lateral or horizontal angular velocity and, separately therefrom, a second reversing Dove prism which is rotated at half the vertical angle speed; by a single or to provide only one reversing Dove prism which is rotated at half the horizontal and vertical angle speed by a double gear. Consequently, the horizontal angle speed and the vertical angle speed may each be supplied via a sun wheel of an attached, second planetary wheel rotary gear which is in the form of a coaxial bevel wheel rotary gear with external toothing on the two sun wheels, and the initial or output speed resulting from superimposition may be transmitted to the reversing prism in a ratio of 1:1 by means of a toothed belt drive via the intermediary of the web of the planetary wheel gear (without stepping-up or -down).

Additional features of the invention are found in the sub-claims.

The invention extends not only to the individual features, but also to their advantageous combination.

The invention will be described further, by way of example, with reference to the accompanying drawings, in which:

FIG. 1 is a longitudinal, sectional view of a panoramic periscope having a viewing window disposed inside a housing which, together with the central tube, is rotatably mounted. The optical axis of the viewing window extends in a plane parallel to the ray path in the central tube, and the periscope has a separate reversing prism with a planetary wheel rotary gear for rotating the prism and for producing upright images which are not reversed laterally;

Figure 2:
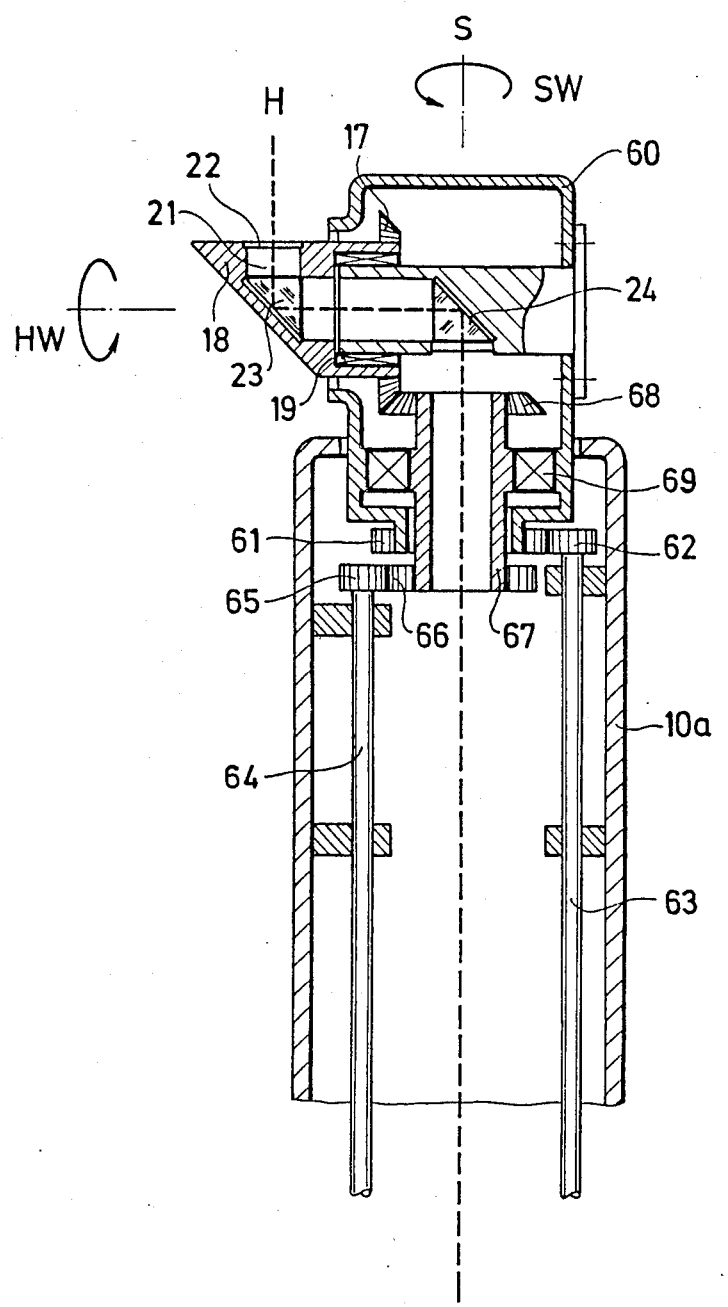
Figure 3:
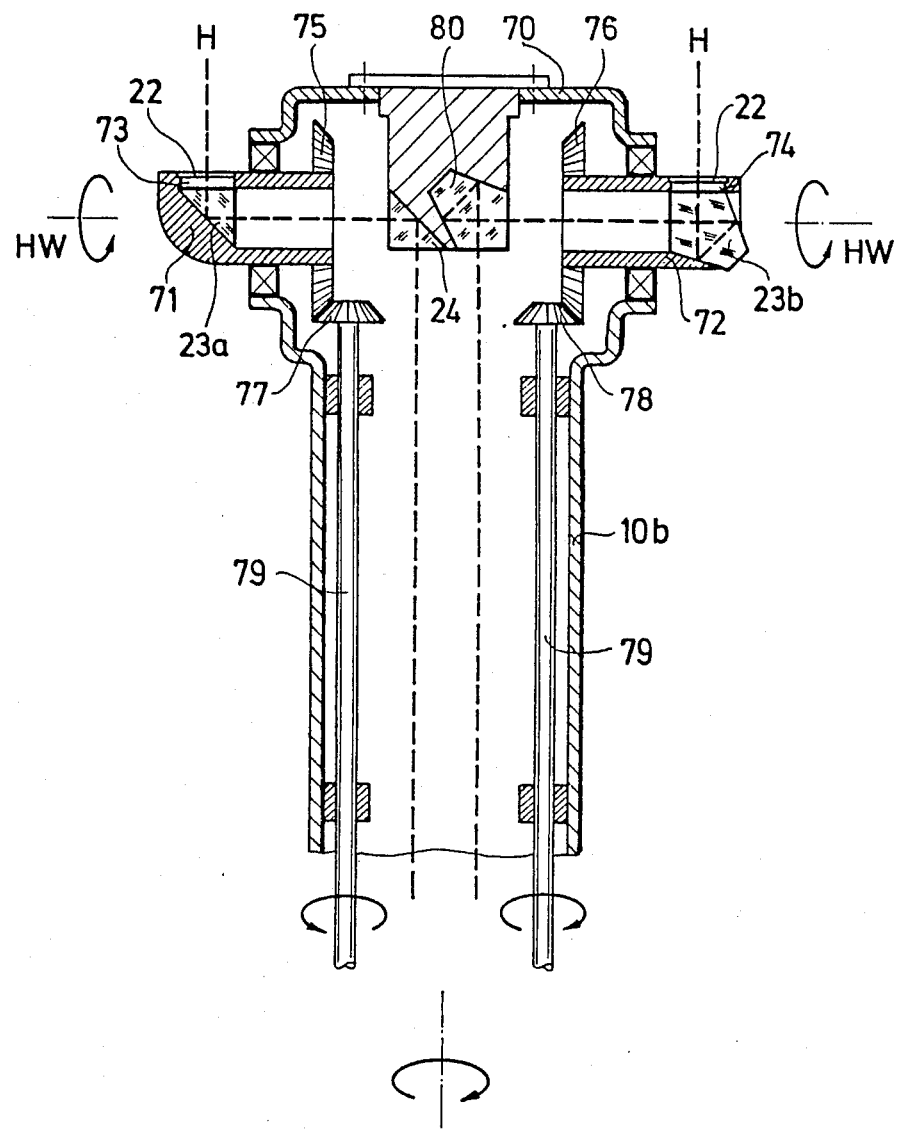

FIG. 2 is a longitudinal, sectional view of a modified arrangement having a different drive means inside the central tube and a viewing hood which is independently rotatable relative to the central tube; and FIG. 3 is a longitudinal, sectional view of an additional, modified arrangement of a panoramic periscope having two diametrically opposed housings, each housing being provided with a radial, internal viewing window, and said windows are mounted so as to be synchronously rotatable about their longitudinal axis relative to the rotatable central tube with a further modified drive means inside the central tube.

A rotatable, generally perpendicular central tube 10 forms a component part of a panoramic periscope which may be used in submarines, tanks or armoured cars, money transporters, bunkers are even in property surveillance.

Figure 1:
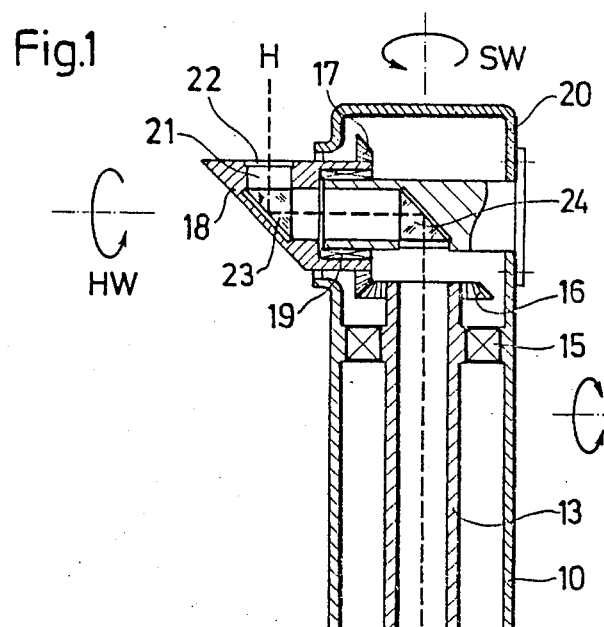
FIG. 1a is a schematic, part-sectional, side elevational view of a prism system which is displaceable out of the ray paths of the central tube shown in FIG. 1.
FIG. 1b is a schematic, part-sectional, side elevational view of a different prism system which is displaceable out of the ray path of the central tube shown in FIG. 1.
FIG. 1c is a schematic, part-sectional view of a modified prism system which is displaceable out of the ray path of the central tube shown in FIG. 1.
FIG. 1d is a longitudinal, sectional view of a panoramic periscope shown in FIG. 1, having two reversing prisms and a planetary wheel rotary gear for rotating the prisms.

In the embodiment of a panoramic periscope shown in FIG. 1, this central tube 10 is provided with a lower, fixed toothed wheel 12 which is rotated by a toothed wheel 31 of a collective drive 11 via a toothed drive 12a or the like, the central tube 10 being capable of rotating through 360° or more.

A hollow transmission shaft 13 extends in the longitudinal axis of this central tube 10 and is rotatable in upper and lower ball bearings 15 mounted in the central tube 10.

This transmission shaft 13 is also driven by means of a lower toothed wheel 14 which is secured to the shaft and is displaced externally of the central tube 10 by means of a toothed belt drive 14a via a toothed wheel 37 of the same total drive 11.

At its upper end, the hollow transmission shaft 13 is provided with a bevel toothed crown or rim 16 which has an imaginary, vertical axis and meshes with an additional bevel toothed wheel rim 17 which has an imaginary, horizontal axis and is secured to the outer surface of a housing 18 which is also mounted by means of ball bearings 19 or the like in a viewing head or hood 20 serving as a panoramic hood.

Ths housing 18 has an imaginary longitudinal axis which extends perpendicular to the longitudinal axis of the hollow transmission shaft 13. A viewing window 21 with a plane-parallel glass plate 22 is provided on the outside of the radial periphery of this housing 18 and can rotate, together with this housing 18, about the axis of the housing through 360° or more, depending on the possible rotation of the housing 18.

A 45°0 mirror or prism 23 on the inner surface of the viewing window 21 reflects the incoming rays onto an additional, corresponding, internal 45° mirror 24 which is securely disposed in the viewing hood 20, or onto a prism which, in turn, reflects the incoming rays through the hollow transmission shaft 13 into a lower prism system 26.

In FIG. 1, the drive or transmission 11 is a double planetary wheel rotary gear, wherein a handwheel 30 and therebelow a toothed wheel 31, provided with the toothed belt 12a, are mounted on a continuous central shaft 32 which has an upper bevel wheel 33 and a lower bevel wheel 34 in its central portion at a specific distance from one another. With such a double gear, a single prism 26 is sufficient for producing the desired upright, true-to-side image.

These two bevel wheels 33 and 34 co-operate with the bevel wheels of the two rotary wheel gears 35 and 36 which are combined to form a double planetary wheel rotary gear, wherein the toothed wheel 37 (for toothed belt 14a) is mounted at the upper end and the toothed wheel 38 (for the toothed belt 26a) is mounted at the lower end.

A central bevel wheel 39 meshes with a corresponding bevel wheel 40 of a handwheel 41. If this handwheel 41 is held fast and the handwheel 30 is altered, a reversing prism 26 rotates in a transmission ratio of 1:1. If the handwheel 30 is held fast and the handwheel 41 is altered, the toothed wheel 37 is displaced and rotates the hollow transmission shaft 13 in a transmission ratio of 2:1.

The stepping-down or stepping-up of this drive 11 is selected so that the hollow transmission shaft 13 is always rotated at the same speed (synchronous operation) relative to the central tube 10 when it is desirable to alter only the lateral or horizontal visual angle SW of the viewing axis H of the panoramic periscope, i.e. when it is necessary to avoid a displacement of the central tube 10 relative to the hollow transmission shaft 13. If, however, it is desirable to alter the vertical visual angle HW as well as the horizontal visual angle SW of the viewing axis H of the panoramic periscope, the rotary drive for the vertical visual angle is superimposingly added to the synchronous drive of the central tube 10 by means of the above-mentioned planetary wheel rotary gear.

In FIG. 1, the individual reversing prism (26) is also provided with a toothed rim 26b which is rotated by the toothed wheel 38 of the drive 11 by means of a toothed belt drive 26a. The double gear of FIG. 1 gives the Dove prism 26 a lateral reversal with a one half lateral angular drive and a super imposed one half vertical angular drive.

Figure 1B:
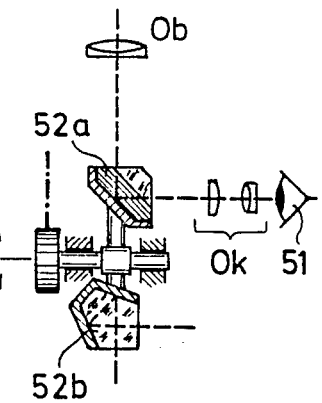
Figure 1A:
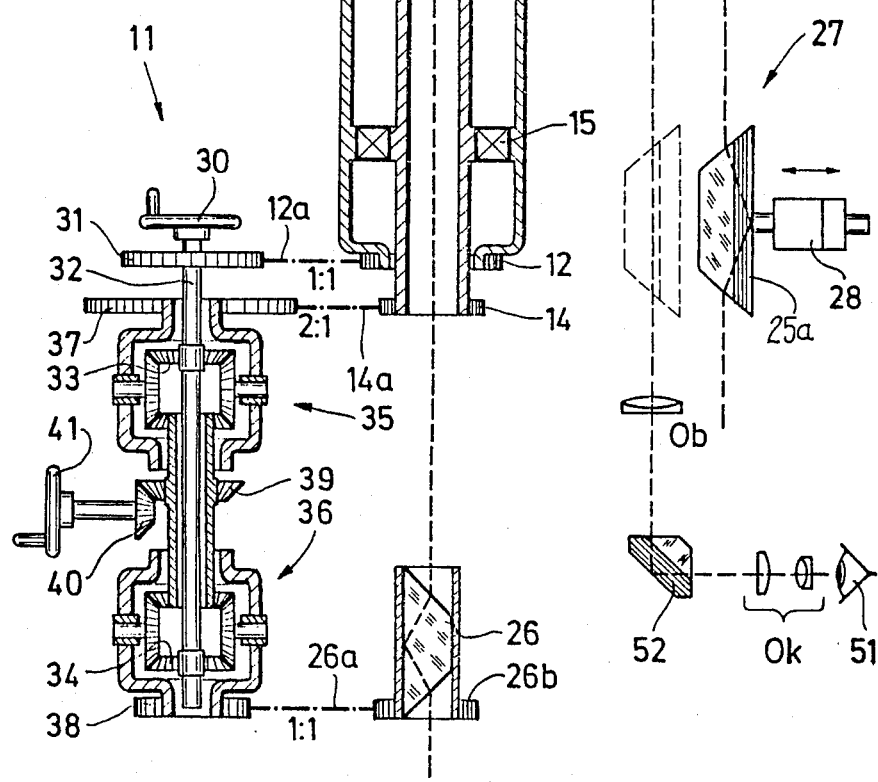
Figure 1D:
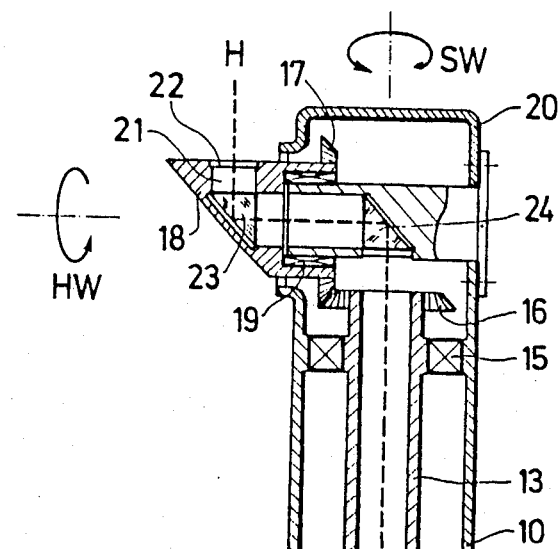

As an alternative solution thereto, FIG. 1d illustrates two Dove reversing prisms 29c and 27c, wherein the image is laterally reversed or inverted, which are each provided with a toothed rim 29a and 27a respectively, said rims being rotated in a desired manner, together with the central tube 10 or housing 18 respectively, by the toothed wheel 42 or 38a respectively of a modified drive 11 by means of a toothed belt drive 29b or 27b, namely at half the speed of the vertical visual angle or horizontal visual angle respectively. With such a single gear as shown in FIG. 1d, the two Dove prisms 27c and 29c are necessary to produce the desired upright, true-to-side image.

Figure 1C:
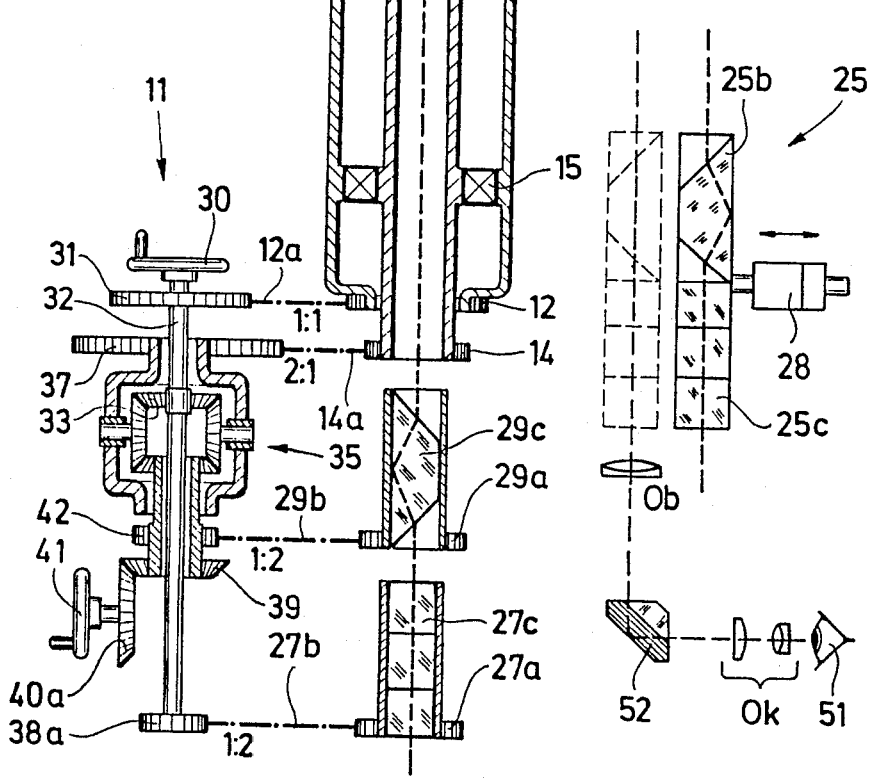

Instead of using a prism system as shown in FIG. 1a or FIG. 1c, the same effect of a vertical and lateral horizontal inversion and reversal of the real image from the viewing axis H passing through the zenith is achieved in a simple manner by a modified prism system as shown in FIG. 1b. The vertical and horizontal inversion is effected here by exchanging (e.g. by swivelling) the triangular Amici prism 52a, which is provided with a top edge as shown in FIG. 1b, for a pentagonal Amici prism 52b.

FIG. 1a and FIG. 1c illustrate additional prism systems 27 or 25b or 25c respectively for the vertical and horizontal inversion of the eyepiece (ocular) image, and such a prism system is displaceably connected to an inverting or rotary magnet 28 or the like, which permits the prism system 25, 27 to be drawn or pivoted from the ray path which pass through the longitudinal axis of the hollow transmission shaft 13. The single gear of FIG. 1c produces a complete, vertical and lateral reversal of the image at the zenith.

The pivotal movement (or the like) of the prism system 25, 27 or respectively the exchange of the prisms 52a and 52b is effected after the viewing axis H has passed through the zenith.

Alternatively, as shown in FIG. 11a, the prism system 25 which is shown in FIG. 1c with two Dove prisms 25b and 25c, which are rotated through 90° relative to one another, may be replaced by a Amici prism 25a with the hypotenuse face serving as a top face for the vertical and horizontal inversion of the eyepiece image.

If the observer or viewer 51 looks into the eyepiece Ok having the eyepiece Amici prism 52 and the objective or lens Ob provided in front of the prism 52, he sees here in each rotary position of the central tube 10 and/or viewing window 21 a real, true to side, upright image irrespective of whether he wishes to see an object in the horizontal plane or in the zenith and beyond.

FIG. 1d illustrates the same rotatable central tube 10 as in FIG. 1 with a hollow transmission shaft 13, a separately rotatable housing 18 and a viewing window 21.

In such a case, therefore, only a planetary wheel rotary gear 35 is provided as a total drive wherein, in addition to the toothed wheels 31 and 38a which are already described in connection with FIG. 1, a central toothed wheel 42 is provided which rotates, via a toothed belt drive 29b, a toothed wheel 29a on the additional prism 29c, so that both the prism 27c and the prism 29c can actually be driven at different transmission ratios, but prism 27c rotates at half the speed of the horizontal visual angle, and prism 29c rotates at half the speed of the vertical visual angle.

In the modified embodiment of FIG. 2, the viewing hood 60 is separately rotatable relative to a stationary central tube 10a, i.e. by means of a toothed wheel 61 which is mounted at the lower end of the viewing hood 60 and meshes with an additional toothed wheel 62 which is rotated by a total drive 11 via the shaft 63 which is secured to the toothed wheel 62.

A toothed wheel 65 is secured to the upper end of an additional shaft 64, which rotates in a parallel manner in the central tube 10a, and the toothed wheel 65 meshes with a corresponding spur wheel toothed rim 66 which is mounted at the lower end of a short, hollow transmission shaft 67. In the same way as shown in FIG. 1, this hollow transmission shaft is provided at its upper end with a bevel toothed wheel rim 68 which meshes with the bevel toothed wheel rim 17. The bevel toothed wheel rim 17 is mounted on the separate housing 18 which rotates about a horizontal, longitudinally extending axis through 360° or more and is mounted in the viewing head or hood 60 by means of roller bearings 19.

Here also, as in FIG. 1, a viewing window 21 is provided with, for example, a plane-parallel glass plate 22 and a mirror 23 or a prism, the ray path at one end being reflected by the mirror 23 or the like and by a mirror 24, which is securely disposed in the viewing hood 60, or by a prism.

The viewing hood 60 is mounted in the central tube 10a so as to be rotatable relative to the hollow transmission shaft 67 by means of ball bearings 69 and by a sealed friction bearing bush which is not shown more fully, with the result that, when the viewing hood 60 is rotated relative to the non-rotating central tube 10a, it becomes possible to view, in a conventional (known) manner, objects in the horizontal plane as well as objects in the zenith and forwardly and rearwardly therefrom.

In the modified arrangement of FIG. 3, two housings 71 and 72 lie opposite one another in a common longitudinal axis and are disposed in the viewing hood 70 which is secured to the central tube 10b in a rotatably mounted manner, each housing having a viewing window 73 and 74 respectively which lies in the same optical axis and is provided with a plane-parallel glass plate 22 and prisms 23a and 23b.

The bevel wheel toothed rims 75 and 76 of the housings 71 and 72 are in fact rotated by separate bevel wheels 77 and 78, but they are synchronously rotated by a common drive 11 with shafts 79 interposed therebetween.

In the center of the viewing hood 70, a mirror 24 is mounted on one side and a pentagonal angular prism 80 is mounted adjacent thereto on the other side. The impinging, horizontal rays come from outside, enter through the viewing windows 73 and 74 and are reflected by means of the prisms 23a and 23i b. The mirror 24 and the prism 80 reflect these rays through 90° into the direct vicinity of the parallel-extending optical axis of the hollow central tube 10b.

When the viewing window 21, 73 or 74 is in its horizontal (lateral) position, and when the viewing hood 20, 60 or 70 is rotated (either on its own or in association with central tube 10), it is possible to view objects in a conventional manner in the horizontal plane (horizontal visual angle). When the viewing window 21, 73 or 74 is rotated further about the longitudinal axis of the housing, it is surprisingly easy to view the zenith (vertical visual angle).

The optical image seen in the eyepiece is always upright and true to side, irrespective of the movements made by the object, on the one hand, and accordingly by the viewing window, on the other hand, so that it is just as if the naked eye were directly seeing the object itself.

The prism 23b is a pentagonal prism which, when an objective plane-parallel disc/plate glass 22 of the viewing housing 72 is in its zenith position (cf. FIG. 3), is rotated about an axis, which extends at right angles to the drawing plane, through 180° relative to the additional, central pentagonal prism 80.

When the pentagonal prism 23b is in its position with the objective glass 22 pointing downwardly, it lies approximately in a mirror-image manner relative to the central pentagonal prism 80, the axis of symmetry for the mirror-image position extending parallel to the axis of rotation of the central tube 10.

The same also applies to two triangular prisms 23a and 24 (FIG. 3), and, when the objective glass 22 of the viewing housing 71 is in its zenith position, the prism 23a is rotated about an axis, which extends at right angles to the drawing plane, through 180° relative to the additional, central triangular prism 24.

When the objective lens 22 is in its downward position, the two triangular prisms 23a and 24 lie approximately in a mirror-image manner relative to each other, the axis of symmetry for the mirror-image position extending parallel to the axis of rotation of the central tube 10.

The vertical angle rotary drive 39, 40, 41 or respectively 39, 40A, 41 may be termed a reversing gear which reverses the rotary direction of the vertical angle drive as the path of rays from the viewing window (21, 73, 74) passes into the zenith (or beyond the zenith).

We claim:

1. In a panoramic periscope having a ray path for the visual observation of objects and having a central tube with an ocular disposed laterally thereon, the central tube being provided with a system of lenses, prisms and mirrors and having a peripheral viewing window which is mounted so as to be rotatable with an angle speed about the longitudinal axis of the central tube through a horizontal angle of 360° or more, said window being mounted in a viewing hood disposed above the central tube and lying at an angle relative to the longitudinal axis of the central tube, the window being radially disposed in a viewing housing which has a prism or the like and is mounted so as to be additionally rotatable with an angle speed about its own longitudinal axis at a vertical angle relative to the longitudinal axis of the central tube, the improvement comprising a system of prisms and/or mirrors connected into the ray path of the periscope and being constructed in such a manner that, when the viewing window is rotated in one direction passing the zenith, a real, true-to-side, upright image appears in the eye lens or ocular; and in the event of the ray path of the viewing window passing the zenith, an additional prism system is incorporated into the ray paths between the eye lens and the viewing window which, despite the ray path overhead, permits a true-to-side, upright image to appear and which is pivoted out of the ray path between the ocular and the viewing window prior to the ray path passing the zenith.

2. A periscope according to claim 1, wherein two diametrically opposed viewing housings are provided with viewing windows and are mounted in the viewing hood so as to be synchronously rotatable about their common longitudinal axis.

3. The periscope according to claim 2, wherein a pentagonal prism is disposed in one of the two viewing housings at a distance from a pentagonal prism which is disposed in the centre of the viewing hood and is offset relative thereto by 180° when the viewing housing is in its zenith position.

4. A periscope according to claim 3, wherein a triangular prism is disposed in the other of the two viewing housings at a distance from a triangular prism which is disposed in the centre of the viewing hood and is offset relative thereto by 180° when the viewing housing is in its zenith position.

5. A periscope according to any of claims 1, or 2 to 4, wherein the central tube is driven by means of a planetary rotary gear.

6. A periscope according to claim 1, wherein two prisms which are each associated with either the vertical angle or the horizontal angle and are disposed in the ray path between the viewing window and the eye lens, are driven directly by means of a planetary wheel rotary gear.

7. A periscope according to claim 1, wherein a reversing prism is rotated at half the horizontal and vertical angle speed and is provided with superimposition of the horizontal and vertical angles for the true-to-height and true-to-side correction of the image orientation appearing in the ocular, the horizontal angle speed and the vertical angle speed being each determined by one of two sun wheels, respectively, of an attached, secondary planetary wheel rotary gear which is in the form of a coaxial bevel wheel rotary gear with external toothing on the two sun wheels, and the initial speed resulting from the superimposition is transmitted to the reversing prism in a ratio of 1:1 by means of a toothed belt drive via the web of the planetary wheel rotary drive.

8. A periscope according to claim 1, wherein the additional prism system for the image representation beyond the zenith is provided with two Dove prisms which serve as reversing prisms and are rotated relative to each other in a longitudinal direction through 90°.

9. A periscope according to claim 1, wherein the additional prism system is provided with a reversing prism and includes two alternatively inwardly and outwardly pivotal prism systems containing an Amici prism with the hypotenuse face serving as a roof face.

* * * * *